(12) United States Patent
Martin et al.

(10) Patent No.: US 9,975,431 B2
(45) Date of Patent: May 22, 2018

(54) TORQUE CONTROL SYSTEM

(75) Inventors: Timothy John Martin, Berkshire (GB); Steven Angell, Wiltshire (GB)

(73) Assignee: PROTEAN ELECTRIC LIMITED (GB)

( * ) Notice: Subject to any disclaimer, the term of this patent is extended or adjusted under 35 U.S.C. 154(b) by 1078 days.

(21) Appl. No.: 13/388,009

(22) PCT Filed: Jul. 9, 2010
(Under 37 CFR 1.47)

(86) PCT No.: PCT/IB2010/053143
§ 371 (c)(1),
(2), (4) Date: Sep. 10, 2012

(87) PCT Pub. No.: WO2011/013020
PCT Pub. Date: Feb. 3, 2011

(65) Prior Publication Data
US 2012/0330484 A1 Dec. 27, 2012

(30) Foreign Application Priority Data

Jul. 29, 2009 (GB) .................................. 0913169.9

(51) Int. Cl.
*B60L 15/20* (2006.01)
*B60L 3/00* (2006.01)
(Continued)

(52) U.S. Cl.
CPC ........... *B60L 3/0023* (2013.01); *B60L 3/0076* (2013.01); *B60L 3/06* (2013.01); *B60L 7/18* (2013.01);
(Continued)

(58) Field of Classification Search
None
See application file for complete search history.

(56) References Cited

U.S. PATENT DOCUMENTS

| 7,423,393 B2* | 9/2008 | Wakao et al. .................. 318/371 |
| 8,288,979 B2* | 10/2012 | Bates et al. .................... 318/432 |
| 2008/0001558 A1 | 1/2008 | Kikuchi et al. | |

FOREIGN PATENT DOCUMENTS

WO      2009090386 A2     7/2009

OTHER PUBLICATIONS

PCT International Search Report #1 for PCT/IB2010/053143, dated Jul. 15, 2011, published by the European Patent Office.
(Continued)

*Primary Examiner* — Thomas G Black
*Assistant Examiner* — Demetra R Smith-Stewart
(74) *Attorney, Agent, or Firm* — Valerie M. Davis; The Mason Group Patent Specialist LLC

(57) ABSTRACT

A torque control system for a vehicle having a plurality of wheels, wherein at least two of the wheels are arranged to be driven by separate electric motors, the system comprising a master controller arranged to monitor the torque generated by at least one of the electric motors and upon a determination that the torque produced by the at least one electric motor is reduced as a result of a predetermined condition the master controller is arranged to adjust the torque generated in the at least one electric motor and/or another electric motor so that the torque generated by the at least one electric motor and the another electric motor are substantially the same.

5 Claims, 4 Drawing Sheets

(51) Int. Cl.
*B60L 3/06* (2006.01)
*B60L 7/18* (2006.01)
(52) U.S. Cl.
CPC ........... *B60L 15/20* (2013.01); *B60L 2220/44* (2013.01); *B60L 2240/36* (2013.01); *Y02T 10/646* (2013.01); *Y02T 10/648* (2013.01); *Y02T 10/7258* (2013.01)

(56) References Cited

OTHER PUBLICATIONS

PCT International Search Report #2 for PCT/IB2010/053143, dated Oct. 13, 2011, published by the European Patent Office.
PCT Written Opinion for PCT/IB2010/053143 published by the Intellectual Property Office dated Aug. 13, 2009.
UK Office Action for GB0913169.9, dated Aug. 13, 2009.

* cited by examiner

TORQUE CONTROL SYSTEM

The present invention relates to a torque control system and in particular a torque control system for a vehicle having a plurality of wheels, where at least two of the wheels are arranged to be driven by separate electric motors.

With increased interest being placed in environmentally friendly vehicles there has, perhaps unsurprisingly, been a corresponding increase in interest in the use of electric vehicles.

Although most commercially available electric vehicles utilise a central electric motor that is used to drive two or more of the vehicles wheels, an alternative solution that is gaining increased popularity utilises in-wheel electric motors, where individual electric motors are used to drive the respective wheels of a vehicle.

However, for vehicles in which multiple wheels are individually powered, to maintain drive stability, when driving in a straight line, it is desirable that the electric motor system be designed so that torque generated by the different electric motors be substantially the same.

However, if one or more of the in-wheel electric motors develops a fault that prevents the one or more in-wheel electric motors from providing a requested torque value this can cause a torque imbalance between the vehicle wheels that would require, if the vehicle is to proceed in a straight line, continuous corrective steering action to be applied by a user of the vehicle.

It is desirable to improve this situation.

In accordance with an aspect of the present invention there is provided a torque control system and torque control method according to the accompanying claims.

This provides the advantage of allowing torque to be balanced between different in-wheel electric motors should one of the in-wheel electric motors develop a fault.

The present invention will now be described, by way of example, with reference to the accompanying drawings, in which.

Figure 5:
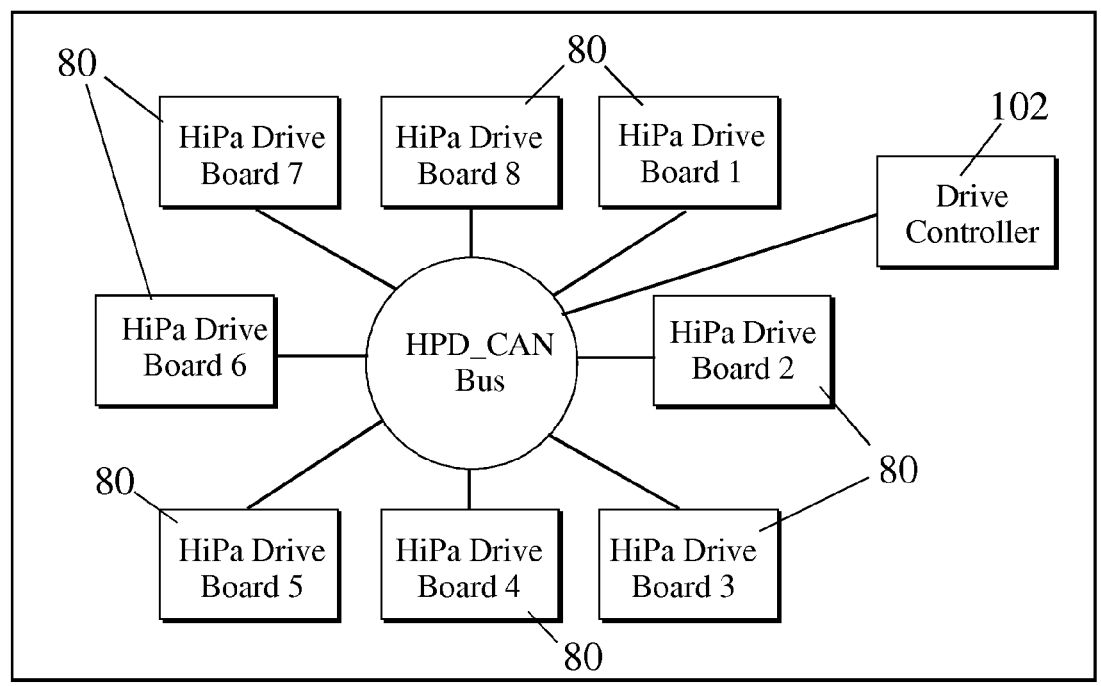
Figure 4:
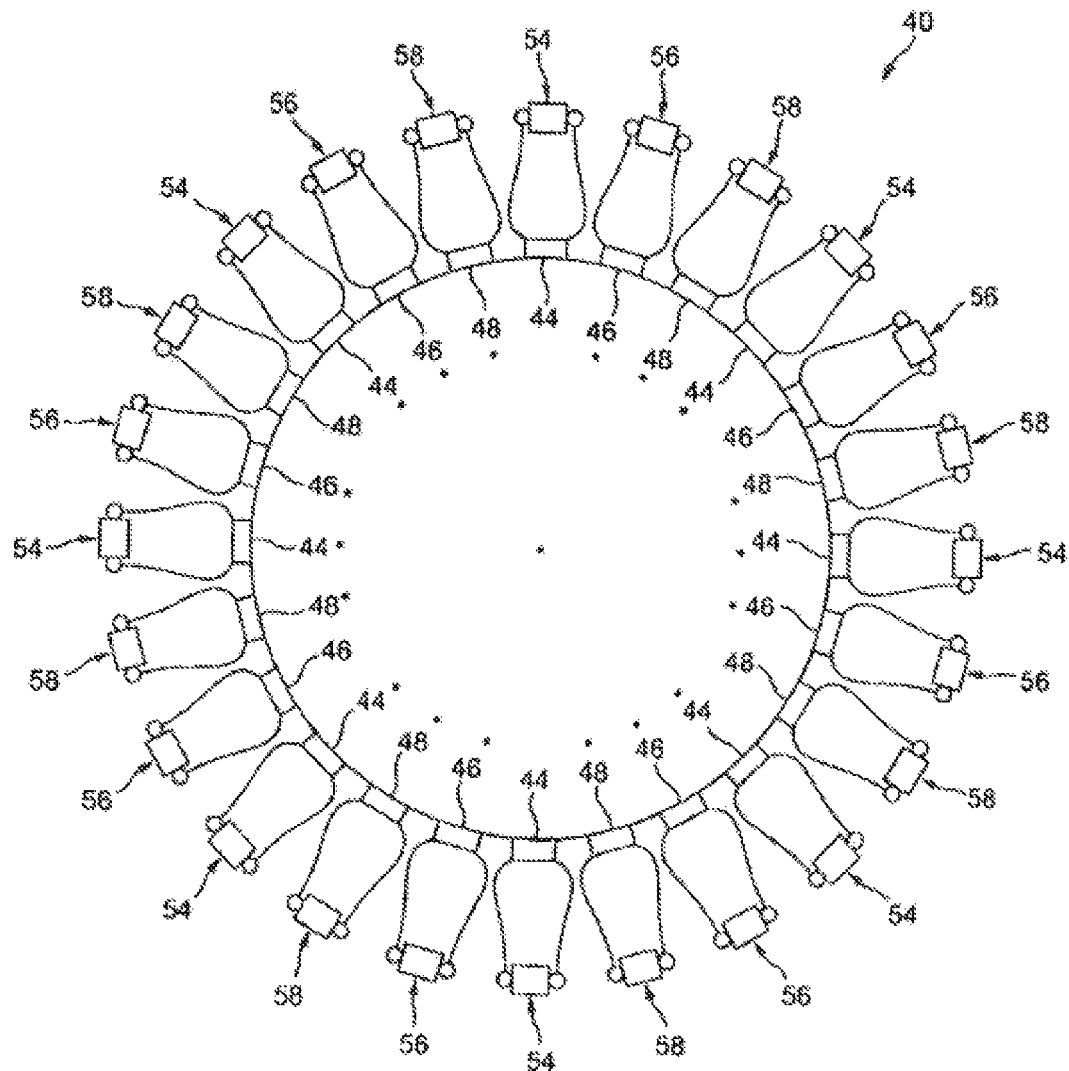

FIG. 4 schematically shows an example for a three phase motor according to an embodiment of the present invention;

FIG. 5 illustrates the communication interface between an in-wheel electric motor and a master controller according to an embodiment of the present invention.

Figure 1:
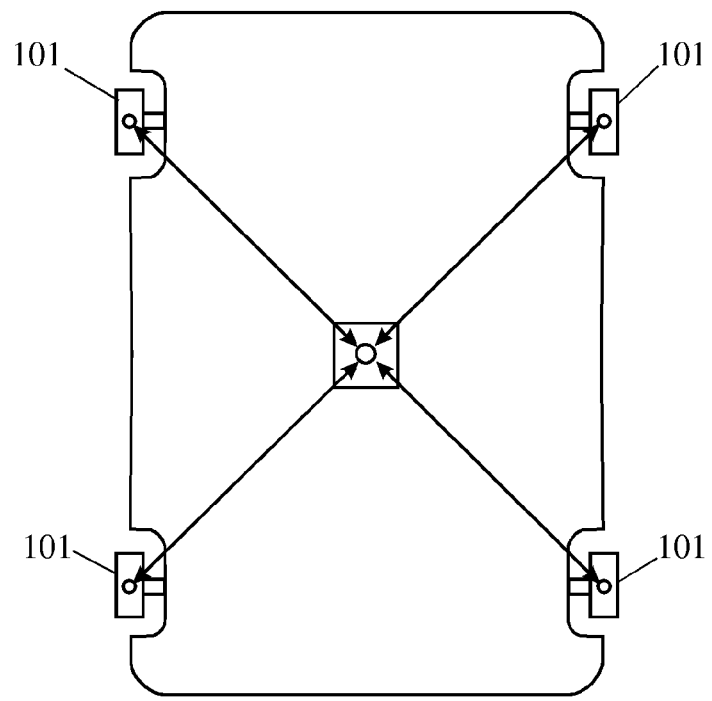
FIG. 1 illustrates a vehicle according to an embodiment of the present invention.

FIG. 1 illustrates a vehicle 100, for example a car or lorry, having four wheels 101, where two wheels are located in the vehicles forward position in a near side and off side position respectively. Similarly, two additional wheels are located in the vehicles aft position in near side and off side positions respectively, as is typical for a conventional car configuration. However, as would be appreciated by a person skilled in the art, the vehicle may have any number of wheels.

Incorporated within each wheel 101 is an in-wheel electric motor, as described in detail below. However, although the current embodiment describes a vehicle having an in-wheel electric motor associated with each wheel 101, as would be appreciated by a person skilled in the art only a subset of the wheels 101 may have an associated in-wheel electric motor. For example, for a four wheeled vehicle only the front two wheels may have associated in-wheel motors or alternately only the rear two wheels may have associated in-wheel motors.

Coupled to each in-wheel electric motor is a master controller 102, where the function of the master controller 102 is described in detail below.

For the purpose of illustration the in-wheel electric motor is of the type having a set of coils being part of the stator for attachment to the vehicle, radially surrounded by a rotor carrying a set of magnets for attachment to a wheel. However, as would be appreciated by a person skilled in the art, the present invention is applicable to other types of electric motors. For the avoidance of doubt, the various aspects of the invention are equally applicable to an electric generator having the same arrangement, where for example the electric generator generates torque during regenerative braking. Typically, upon demand, an in-wheel electric motor will be configured to provide both drive torque and regenerative braking torque.

Figure 2:
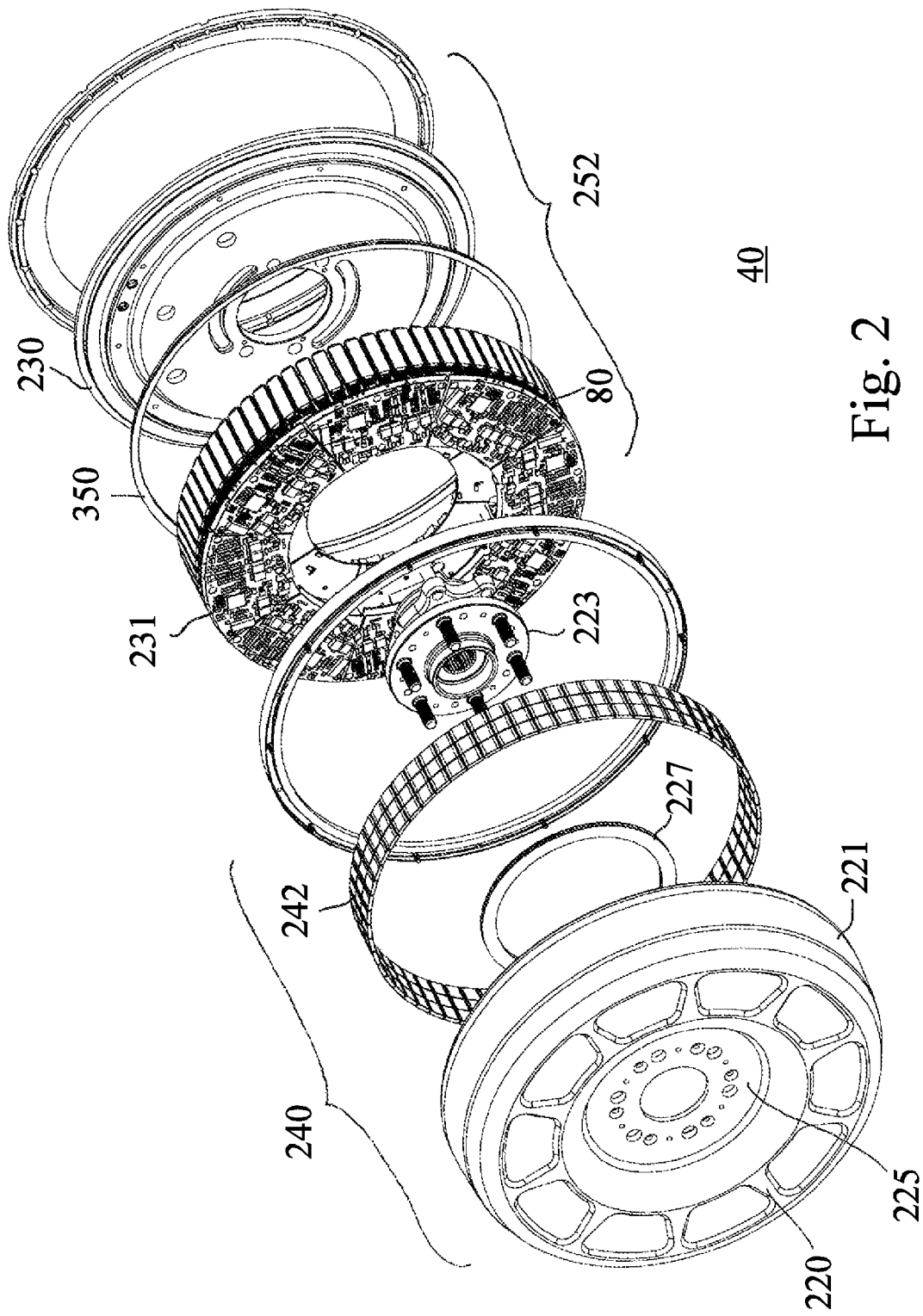
FIG. 2 illustrates an exploded view of an electric motor as used in an embodiment of the present invention.

As illustrated in FIG. 2, the in-wheel electric motor 40 includes a stator 252 comprising a rear portion 230 forming a first part of the housing of the assembly, and a heat sink and drive arrangement 231 comprising multiple coils and electronics to drive the coils. The coil drive arrangement 231 is fixed to the rear portion 230 to form the stator 252 which may then be fixed to a vehicle and does not rotate during use. The coils themselves are formed on tooth laminations which together with the drive arrangement 231 and rear portion 230 form the stator 252.

A rotor 240 comprises a front portion 220 and a cylindrical portion 221 forming a cover, which substantially surrounds the stator 252. The rotor includes a plurality of magnets 242 arranged around the inside of the cylindrical portion 221. The magnets are thus in close proximity to the coils on the assembly 231 so that magnetic fields generated by the coils in the assembly 231 cooperate with the magnets 242 arranged around the inside of the cylindrical portion 221 of the rotor 240 to cause the rotor 240 to rotate.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 233 of the wall 230 of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself.

The rotor also includes a focussing ring and magnets 227 for position sensing.

Figure 3:
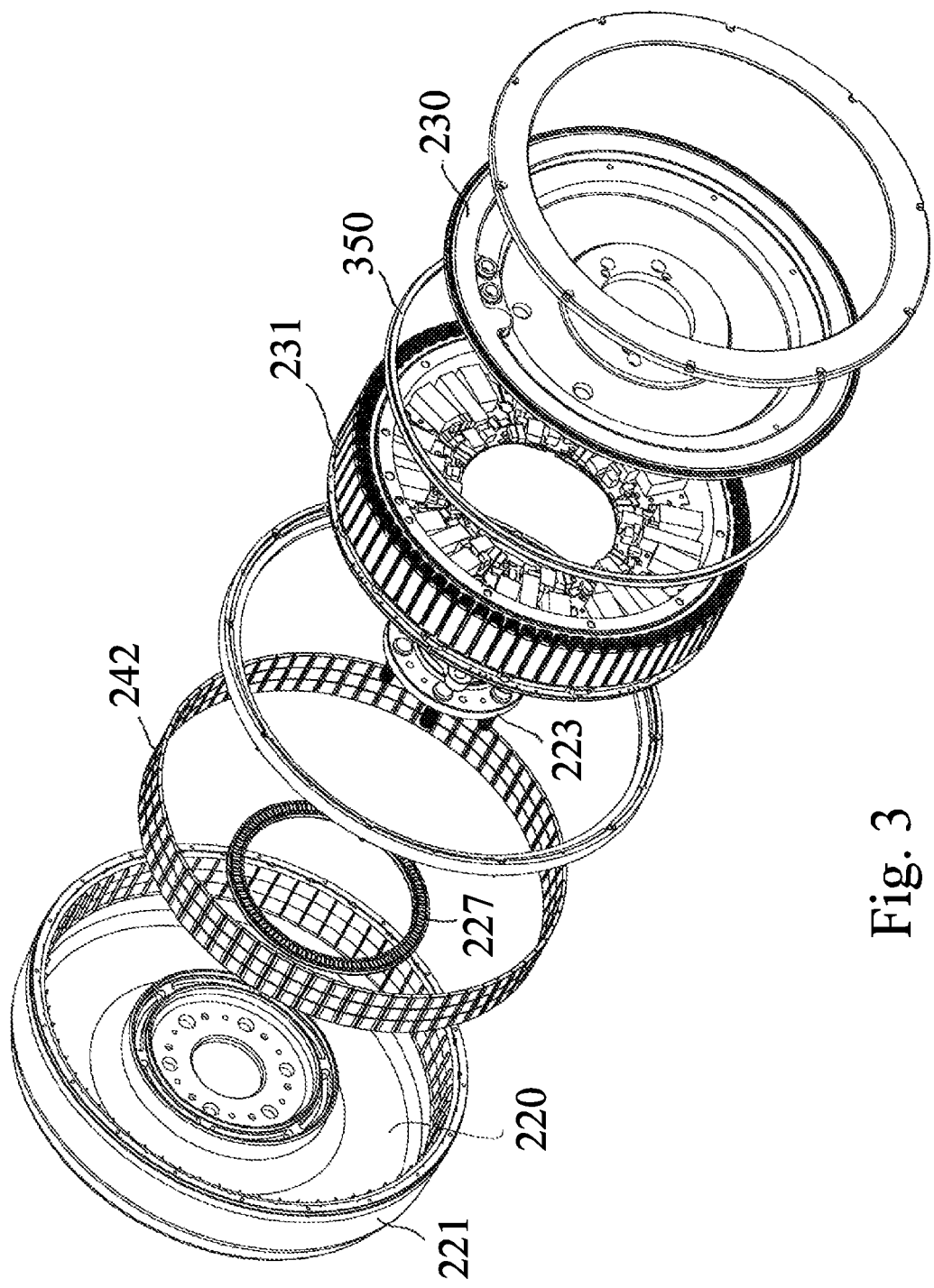
FIG. 3 illustrates an exploded view of the electric motor shown in FIG. 2 from an alternative angle.

FIG. 3 shows an exploded view of the same assembly as FIG. 2 from the opposite side showing the stator 252 comprising the rear stator wall 230 and coil and electronics assembly 231. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

Additionally shown in FIG. 2 are circuit boards 80 carrying control electronics, otherwise known as motor drive controllers. Additionally in FIGS. 2 and 3 a V shaped seal 350 is provided between the circumferential wall 221 of the rotor and the outer edge of the stator housing 230.

Further, in FIG. 3, a magnetic ring 227 comprising a commutation focusing ring and a plurality of magnets is provided for the purpose of indicating the position of the rotor with respect to the stator to a series of sensors arranged on the motor drive controllers 80 of the stator 252.

The electric motor 40 shown in FIGS. 2 and 3 is a three phase motor having three coil sets. In this embodiment, each coil set includes eight coil sub-sets. However, as would be appreciated by a person skilled in the art, the electric motor could have any number of coil sets and coil sub-sets. The coil sub-sets of each coil set are labelled 44, 46 and 48, respectively in FIG. 4. Accordingly, the electric motor illustrated in FIG. 4 has a total of twenty four coil sub-sets (i.e. eight coil sub-sets per coil set).

By way of example, in FIG. 4 some of the coil sub-sets are highlighted with a '*'. If these coil sub-sets were to be powered down, the motor would still be able to operate, albeit with reduced performance. In this way, the power output of the motor can be adjusted in accordance with the requirements of a given application. In one example, where the motor is used in a vehicle such as a car, powering down of some of the coil sub-sets can be used to adjust the performance of the car. In the example shown in FIG. 4, if each of the coil sub-sets indicated with an '*' were powered down the motor would have three coil sets with each coil set having two active coil subsets.

Powering down of one or more of the coil sub-sets has the further benefit that in the event of a failure of one of the coil sub-sets, other coil sub-sets in the motor 40 can be powered down resulting in continued operation of the motor 40 in a manner which retains a balanced magnetic field profile around the periphery of the motor for appropriate multiphase operation.

A motor drive controller 80 is arranged to drive a group of three coil subsets. For example, a motor drive controller can be associated with the first three coil subsets 44, 46, 48 located at the top of FIG. 4. Another motor drive controller 80 is associated with the next three coil subsets, and so on. Accordingly, the in-wheel electric motor includes eight motor drive controllers 80 arranged to drive the respective coil subsets to form a distributed internal motor architecture that uses multiple motor drive controllers 80 for controlling the torque generated by the in-wheel electric motor.

The distributed motor drive controller configuration, where each motor drive controller 80 drives a group of three coil sub-sets with a three phase voltage, can be regarded as a group of logical sub motors. Each logical sub-motor can be driven independently of the other sub motors within the in-wheel electric motor with each logical sub-motor being driven as a three phase motor.

The motor drive controller 80, which acts as an inverter for the associated logical sub-motor, includes a number of switches which may typically comprise one or more semiconductor devices. The motor drive controller 80 includes a printed circuit board upon which a number of components are mounted. The circuit board includes means for fixing the motor drive controller 80 within the electric motor 40, for example, adjacent to the coil sub-sets that the respective motor drive controller controls. In the illustrated example, these means include apertures through which screws or suchlike can pass. In this example, the printed circuit board is substantially wedge-shaped. This shape allows multiple motor drive controllers 80 to be located adjacent each other within the motor, forming a fan-like arrangement.

The motor drive controller 80 switches can include semiconductor devices such as MOSFETs or IGBTs. In the present example, the switches comprise IGBTs. However, any suitable known switching circuit can be employed for controlling the current within the coils of the coil sub-set associated with the motor drive controller 80. One well known example of such a switching circuit is the H-bridge circuit.

Each motor drive controller 80 also includes a processor, where the processor is arranged to operate the switches in accordance with a pulse width modulation scheme for controlling the torque of the respective logical sub motor, as is well known to a person skilled in the art. The processor is arranged to receive a torque demand from the master controller 102 via a CAN interface, however any form of communication link between the master controller 102 and the respective motor drive controller 80 could be used.

In response to control signals from the master controller 102 that are indicative of a required torque, each motor drive controller 80 is arranged to pulse width modulating a signal applied to the semiconductor switches that form a three phase H-bridge circuit to control the voltage applied to the set of three coil subsets for the purposes of generating an electric motor torque, as is well known to a person skilled in the art.

The torque request will typically be initiated by a user of the vehicle 100 indicating a desire to increase or decrease the acceleration of the vehicle. The torque request, which will typically be input by a user of the vehicle via a demand device, will be interpreted by the master controller 102 and communicated to the in-wheel electric motors 40.

FIG. 5 illustrates the eight motor drive controllers 80 of an in-wheel electric motor coupled to the master controller 102 via a CAN bus. As stated above, each motor drive controller 80 is arranged to drive three coil sub-sets with a three phase voltage supply. The individual motor drive controllers 80 can communicate with both the master controller and the other motor drive controllers 80 within the in-wheel electric motor via the CAN bus.

The motor drive controllers 80 associated with the other in-wheel electric motors 40 are also coupled to the master controller 102 via the CAN bus and are able to communicate with the master controller 102 and the other motor drive controllers 80 within the respective in-wheel electric motor via the CAN bus.

The master controller 102 provides control signals to each of the motor drive controllers 80 within each of the in-wheel electric motors for controlling the operation of the respective motor drive controller 80. Examples of control signals from the master controller 102 to the motor drive controllers 80 include torque demand, rotational speed, direction in which torque is to be applied (i.e. clockwise or counter clockwise), a signal as to whether a specific motor drive controller 80 should be enabled or disabled.

Accordingly, the master controller 102 can control the operation of each of the motor drive controllers 80 within an in-wheel electric motor 40 and correspondingly control the operation of the respective logical sub motors that form part of the in-wheel electric motor.

Consequently, within a given in-wheel electric motor 40 the motor controller 102 can disable one or more of the motor drive controllers 80 and/or adjust the torque generation for one or more of the logical sub motors.

The motor drive controllers 80 are arranged to provide data signals, via the CAN interface, to the master controller 102 that provide motor drive controller status information to the master controller 102. Examples of status information provided by the motor drive controller 80 to the master controller 102 include coil current, rotational speed, over-current, over-voltage, under-voltage, over temperature, faulty position sensor, and faulty current sensor. However, other fault data can be provided from a motor drive controller 80 to the master controller 102.

In response to the received data the master controller 102 determines whether there is a fault associated with the motor drive controller 80 from which the data has been received. A fault condition may be indicated by an out of operating range condition, for example over current, over voltage, under voltage or over temperature. Alternatively, a fault condition may be indicated by a component failure.

The fault condition may result in a direct loss of torque, for example, if one of the logical sub motors were to fail. Alternatively, the master controller 102 may reduce the torque demand to a motor drive controller 80, independent of the other motor drive controllers 80, upon receipt of an out of operating range condition received from a motor drive controller 80, for example upon receipt from a motor drive controller 80 that the temperature of the associated logical sub motor is above the recommended operating temperature. To compensate for the out of operating range condition the torque demand to the specific motor drive controller 80 could be reduced or the motor drive controller 80 could be disabled.

Preferably, in an in-wheel electric motor 40 having symmetrically arranged logical sub motors, to minimise the strain on the electric motor and maintain smooth running of the electric motor, upon a reduction in torque for one logical sub motor the master controller 102 is arranged to reduce the torque in an oppositely located logical sub motor.

Upon a reduction in torque of one of the vehicle in-wheel electric motors 40 as a result of a fault condition in one or more of the motor drive controllers 80, or associated logical sub motors, the master controller 102 is arranged to adjust the torque generated in one or more of the other vehicle in-wheel electric motors 40 so the torque generated in the in-wheel electric motor 40 in which the fault condition has been identified and at least one other vehicle in-wheel electric motor 40 is substantially the same.

This has the advantage of maintaining torque balance between different in-wheel electric motors, thereby avoiding the need for a driver of a vehicle 100 to provide continuous corrective steering action upon the occurrence of a fault within an in-wheel electric motor.

Further examples will now be described of torque control by the master controller 102 performed in response to a determination that a fault condition in an in-wheel electric motor 40 has resulted in the reduction in torque generated by the in-wheel electric motor 40.

Upon a determination by the master controller 102 that a fault condition has resulted in the reduction in torque generated by an in-wheel electric motor 40, where the torque reduction may have resulted from a fault within the in-wheel electric motor 40 or the master controller 102 may have reduced the torque as a result of a fault condition, the master controller 102 reduces the torque demand sent to all the other in-wheel electric motors so that the torque generated by each of the in-wheel electric motors 40 is substantially the same.

For example, based on a vehicle configuration having four in-wheel electric motors 40, upon a reduction in torque in one of the in-wheel electric motors 40 that has resulted from a fault condition, the master controller 102 reduces the torque demand to the other three in-wheel electric motors 40 so that the torque generated by each of the in-wheel electric motors 40 is substantially the same. Equally, for a vehicle configuration having two in-wheel electric motors 40, upon a reduction in torque in one of the in-wheel electric motors 40 that has resulted from a fault condition, the master controller 102 will request a corresponding torque reduction in the other in-wheel electric motors 40.

Upon a determination by the master controller 102 that a fault condition has resulted in the reduction in torque generated by an in-wheel electric motor 40, where the torque reduction may have resulted from a fault within the in-wheel electric motor 40 or the master controller 102 may have reduced the torque as a result of a fault condition, the master controller 102 reduces the torque demand sent to an electric motor 40 driving a wheel on the same transverse axis position as the in-wheel electric motor 40 that has exhibited a fault condition so that the torque generated by each of the in-wheel electric motors 40 on the same transverse axis is substantially the same.

For example, based on a vehicle configuration having four in-wheel electric motors 40, upon a reduction in torque in one of the in-wheel electric motors 40 that has resulted from a fault condition, the master controller 102 reduces the torque demand to the electric motor 40 driving a wheel on the same transverse axis position as the in-wheel electric motor 40 that has exhibited a fault condition. However, the torque demand requests to the other two in-wheel electric motors 40 will not change, unless as a result of a change in a driver input demand request.

Upon a determination by the master controller 102 that a fault condition has resulted in the reduction in torque generated by an in-wheel electric motor 40, where the torque reduction may have resulted from a fault within the in-wheel electric motor 40 or the master controller 102 may have reduced the torque as a result of a fault condition, for a vehicle configuration having a plurality of in-wheel electric motors 40 on each side of the vehicle the master controller 102 is arranged to reduce the torque demand sent to all electric motors 40 driving wheels on the opposite side of the vehicle to the wheel being driven by the at least one electric motor so that the combined torque of the electric motors driving the wheels on the other side of the vehicle is reduced substantially by an amount corresponding to the torque reduction of the electric motor 40 that has exhibited a fault condition. In other words, the torque reduction resulting from a faulty electric motor 40 is split between more than one electric motor 40 situated on an opposite side of the vehicle, thereby maintaining torque balance between opposite sides of a vehicle.

For example, based on a vehicle configuration having four in-wheel electric motors 40 with two in-wheel electric motors 40 located on both the near side and off side of the vehicle, upon a reduction in torque in one of the in-wheel electric motors 40 that has resulted from a fault condition, the master controller 102 reduces the torque demand to the two in-wheel electric motors 40 located on the opposite side of the vehicle by an amount that in total equals the torque reduction in the faulty in-wheel electric motor 40.

Upon a determination by the master controller 102 that a fault condition has resulted in the reduction in torque generated by an in-wheel electric motor 40, where the torque reduction may have resulted from a fault within the in-wheel electric motor 40 or the master controller 102 may have reduced the torque as a result of a fault condition, if the fault condition corresponds to a failure of one of the motor drive controllers 80 the master controller can instruct at least one of the other motor drive controllers 80 to increase torque generated by their respective motor coil. As such, the master controller can be arranged to individually control the motor drive controllers 80 for a given in-wheel electric motor 40 so that the logical sub motors for an in-wheel electric motor, which do not exhibit a fault, can generate greater torque to compensate for the torque reduction resulting from the faulty logical sub motor. Consequently, the total torque generated by the in-wheel electric motor 40 will stay the same. Alternatively, if the logical sub motors that do not exhibit a fault are unable to fully compensate for a reduction in torque resulting from a faulty motor drive controller 80 the master controller 102 can arrange to reduce the torque in other in-wheel electric motors 40, as described above.

Although the above description describes the varying of torque for driving an in-wheel electric motor the same torque adjustments can also be made under regenerative braking. However, to maximise the braking force it may be desirable not to reduce regenerative braking torque in an in-wheel motor as a result of a fault condition in another in-wheel electric motor.

The invention claimed is:

1. A torque control system for a vehicle having a plurality of wheels, wherein at least two of the wheels are arranged to be driven by separate electric motors, wherein each of the electric motors includes a plurality of motor drive controllers that are arranged to drive separate motor coils, the system comprising a controller arranged to monitor the torque generated by at least one of the electric motors and another electric motor and upon a determination that the torque produced by the at least one electric motor is reduced as a result of a failure of one of the motor drive controllers the controller is arranged to adjust the torque generated in the at least one electric motor by arranging at least one of the other motor drive controllers to increase torque generated by their respective motor coils so that the torque generated by the at least one electric motor and the another electric motor have a predetermined relationship.

2. A torque control system according to claim 1, wherein the predetermined torque relationship is the torque generated by the at least one electric motor and the another electric motor is substantially the same.

3. A torque control system according to claim 1, wherein the electric motors are in-wheel electric motors.

4. A method of controlling torque for a vehicle having a plurality of wheels, wherein at least two of the wheels are arranged to be driven by separate electric motors, wherein each of the electric motors includes a plurality of motor drive controllers that are arranged to drive separate motor coils, the method comprising monitoring the torque generated by at least one of the electric motors and another electric motor and upon a determination that the torque produced by the at least one electric motor is reduced as a result of a failure of one of the motor drive controllers adjusting the torque generated in the at least one electric motor by arranging at least one of the other motor drive controllers to increase torque generated by their respective motor coils so that the torque generated by the at least one electric motor and the another electric motor have a predetermined relationship.

5. A method of controlling torque according to claim 4, wherein the predetermined torque relationship is the torque generated by the at least one electric motor and the another electric motor is substantially the same.

* * * * *